(12) United States Patent
Obaidi et al.

(10) Patent No.: US 10,498,882 B2
(45) Date of Patent: Dec. 3, 2019

(54) SECURE VOICE PRINT AUTHENTICATION FOR WIRELESS COMMUNICATION NETWORK SERVICES

(71) Applicant: T-Mobile USA, Inc., Bellevue, WA (US)

(72) Inventors: Ahmad Arash Obaidi, Bellevue, WA (US); Darren J. Kress, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 736 days.

(21) Appl. No.: 15/160,844

(22) Filed: May 20, 2016

(65) Prior Publication Data

US 2017/0339272 A1 Nov. 23, 2017

(51) Int. Cl.
| | |
|---|---|
| *H04M 3/38* | (2006.01) |
| *G10L 17/06* | (2013.01) |
| *G10L 17/24* | (2013.01) |
| *G10L 25/51* | (2013.01) |
| *H04W 4/12* | (2009.01) |
| *G06F 21/32* | (2013.01) |
| *H04M 3/493* | (2006.01) |
| *H04M 3/533* | (2006.01) |

(52) U.S. Cl.
CPC ............ *H04M 3/385* (2013.01); *G06F 21/32* (2013.01); *G10L 17/06* (2013.01); *G10L 17/24* (2013.01); *G10L 25/51* (2013.01); *H04M 3/4936* (2013.01); *H04M 3/533* (2013.01); *H04W 4/12* (2013.01); *H04M 2201/40* (2013.01); *H04M 2201/41* (2013.01); *H04M 2203/6054* (2013.01)

(58) Field of Classification Search
CPC ......... G06F 21/32; G10L 17/06; G10L 17/24; G10L 25/51; H04M 3/385; H04M 3/4936; H04M 3/533; H04M 2201/40; H04M 2201/41; H04M 2203/6054; H04W 4/12
USPC .................... 379/67.1–88.28; 455/412.1–420
See application file for complete search history.

(56) References Cited

U.S. PATENT DOCUMENTS

| | | | | |
|---|---|---|---|---|
| 6,026,291 A | * | 2/2000 | Carlsson ............... | H04M 15/00 455/405 |
| 6,122,357 A | * | 9/2000 | Farris .................. | H04Q 3/0045 379/201.02 |

(Continued)

OTHER PUBLICATIONS

PCT Search Report and Written Opinion dated Aug. 24, 2017 for PCT application No. PCT/US2017/032723, 11 pages.

*Primary Examiner* — Hemant S Patel
(74) *Attorney, Agent, or Firm* — Lee & Hayes, P.C.

(57) ABSTRACT

A method of accessing a wireless communication network using secure voice print authentication. The method includes receiving a request from a mobile device at a gateway of the wireless communication network for service on the wireless communication network. A voice print is obtained at the gateway from a user using the mobile device. The voice print is compared by the gateway with a primary voice print, wherein the primary voice print is associated with a voicemail account at the wireless communication network, and wherein the voicemail account is associated with a primary user of the mobile device. Based upon comparing the voice print with the primary voice print, the service may be provided to the mobile device on the wireless communication network.

23 Claims, 5 Drawing Sheets

(56) References Cited

U.S. PATENT DOCUMENTS

| | | | | |
|---|---|---|---|---|
| 7,006,605 | B1* | 2/2006 | Morganstein | G06F 21/32 |
| | | | | 379/88.01 |
| 7,035,386 | B1* | 4/2006 | Susen | H04M 3/2281 |
| | | | | 379/114.14 |
| 7,248,857 | B1* | 7/2007 | Richardson | H04M 3/42068 |
| | | | | 379/88.12 |
| 2002/0159571 | A1* | 10/2002 | Stock | G06F 21/32 |
| | | | | 379/88.02 |
| 2003/0065790 | A1 | 4/2003 | Loveland et al. | |
| 2003/0108158 | A1* | 6/2003 | Brown | H04M 1/56 |
| | | | | 379/88.01 |
| 2006/0034287 | A1* | 2/2006 | Novack | G06F 21/32 |
| | | | | 370/395.2 |
| 2006/0188076 | A1* | 8/2006 | Isenberg | H04M 3/385 |
| | | | | 379/88.02 |
| 2009/0110168 | A1 | 4/2009 | Colson et al. | |
| 2010/0316198 | A1* | 12/2010 | Balasaygun | H04M 3/42042 |
| | | | | 379/88.02 |
| 2013/0044867 | A1 | 2/2013 | Walters et al. | |

\* cited by examiner

SECURE VOICE PRINT AUTHENTICATION FOR WIRELESS COMMUNICATION NETWORK SERVICES

BACKGROUND

In recent years, telecommunication devices have advanced from offering simple voice calling services within wireless communication networks to providing users with many new features. Telecommunication devices now provide messaging services such as email, text messaging, and instant messaging; data services such as Internet browsing; media services such as storing and playing a library of favorite songs; location services; and many others. Thus, telecommunication devices, referred to herein as mobile devices, are often used in multiple contexts. In addition to the new features provided by the telecommunication devices, users of such telecommunication devices have greatly increased. Such an increase in users is only expected to continue and in fact, it is expected that there could be a growth rate of twenty times more users in the next few years alone.

With the growth in users of wireless communication networks, there becomes a greater need for increased security when providing access to the wireless communication networks and the services they provide. One possible way for providing increased security includes utilizing voice prints or voice patterns of users in order to identify the users. Gathering and maintaining voice prints from users however can be complicated and cumbersome.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
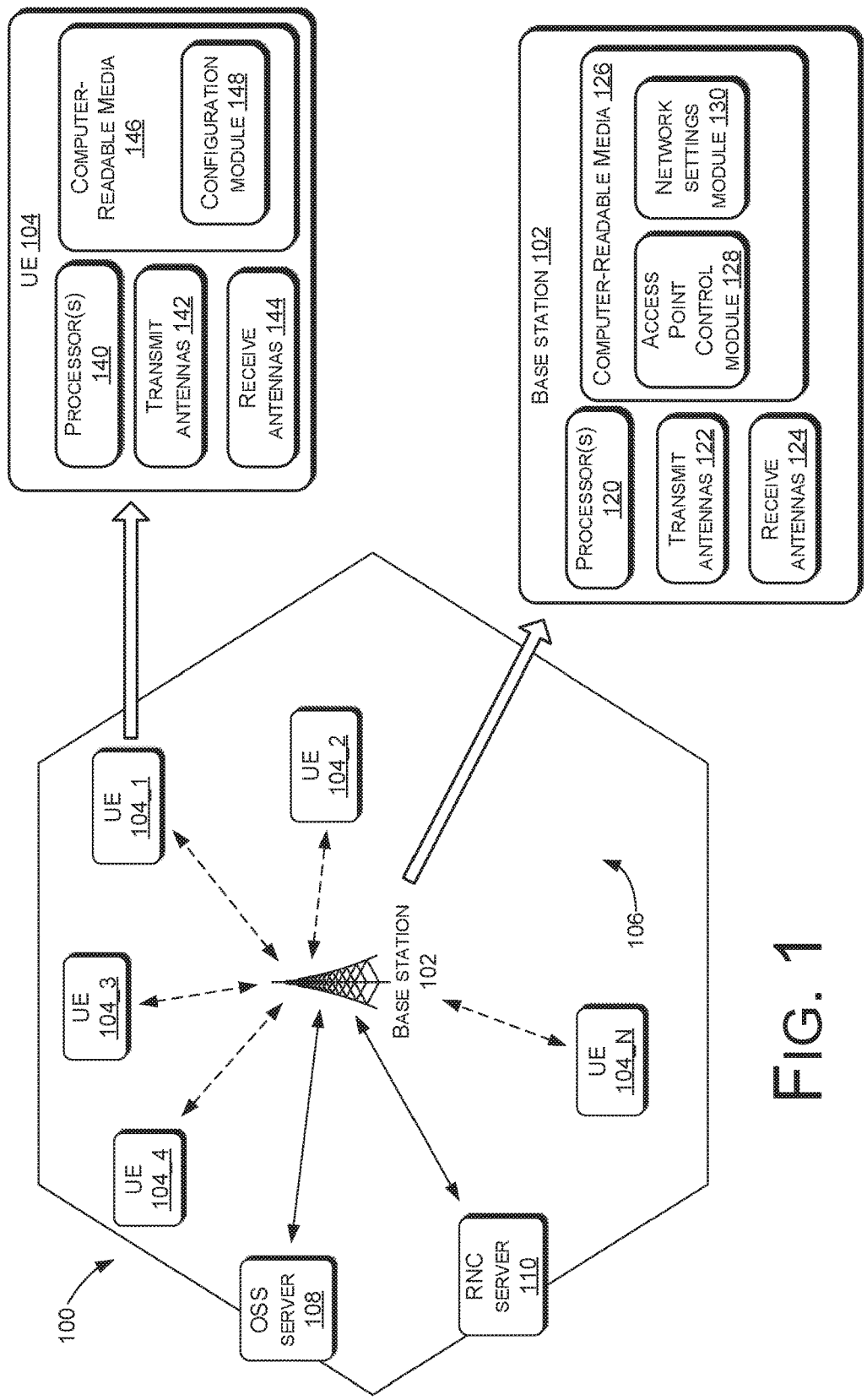
FIG. 1 schematically illustrates a wireless communication network, in accordance with various embodiments.

Described herein are techniques and architecture for providing services on a wireless communication network utilizing secure voice print authentication for security. As used herein, mobile devices include devices configured as Internet of Things (IoT) devices. Generally, Internet of Things refers to a network of physical objects—devices, vehicles, buildings and other items embedded with electronics, software, sensors, and network connectivity—that enables these objects to collect and exchange data. IoT allows objects to be sensed and controlled remotely across existing network infrastructure, creating opportunities for more direct integration of the physical world into computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each thing is uniquely identifiable through its embedded computing system, but is able to interoperate within the existing Internet infrastructure.

In embodiments, voice prints or voice patterns are obtained from voicemail accounts of users of a wireless communication network. The voicemail accounts are associated with phone numbers of the users on the wireless communication network. Thus, if a user attempts to make a phone call using a mobile phone that is associated with the user's phone number within the wireless communication network, the user may be prompted to speak, either before or after entering the phone number that the user is calling. The operator of the wireless communication network can then compare the user's voice print with a voice print used for an outgoing message at a voicemail account associated with the phone number. If the voice print matches the voice print associated with the voicemail account, then the phone call can proceed. In embodiments, the recipient of the phone call can be provided with a positive indication that the caller is actually the authorized user associated with the phone number of the incoming call. In embodiments, a business of the authorized user may also be provided to the recipient of the phone call thereby positively identifying that the authorized user is associated with a particular business. For example, if John Doe is calling from ABC Bank, the recipient of the phone call can receive indication, based on the voice print, that verifies that it is indeed John Doe and that John Doe is indeed associated with ABC Bank.

In embodiments, even if the voice print of the user making the phone call does not match the voice print associated with the voice mail account, the phone call may be allowed to proceed. However, in such an embodiment, no positive identification will be provided to the recipient of the phone call. Furthermore, in embodiments, a notification may be provided to a primary user associated with voice mail account of the phone number indicating that somebody is using the mobile device and/or the primary user's phone number.

In embodiments, phone numbers may also include secondary or additional authorized users (in addition to the primary user) such as, for example, a spouse, children, other family members, friends, business associates, etc. Such additional authorized users may have voice prints that are provided to the operator of the wireless communication network for storage in a database or may have their own voicemail accounts that include voice prints for outgoing messages associated with voicemail accounts for their own phone numbers, i.e. phone numbers for which they are primary users. In such embodiments, the additional authorized users' voice prints may be compared with the voice print on file with the operator of the wireless communication network.

In embodiments, voice prints may be utilized to control use of mobile devices for a certain amount of time during the day and/or for limiting use to certain time periods of the day. For example, a parent may limit use of mobile devices for their children to time periods before and after school and thus, if one of the children attempts to use a mobile device during school hours, then upon matching the voice print of the child with the voice print on record with the operator of the wireless communication network, the mobile device will be denied access to the wireless communication network. Likewise, if the child has exceeded a predetermined amount of time for the day for using a mobile device, if the child attempts to use a mobile device, then upon matching the voice print of the child with the voice print on record with the operator of the wireless communication network, the mobile device the child is attempting to use will be denied access to the wireless communication network.

Additionally, security features can be provided using the voice prints in allowing users of mobile devices to access customer service of the wireless communication network. Based upon positively authenticating the user as one of the primary user and/or an authorized user with appropriate authority, the operator of the wireless communication network may allow the authenticated user to access customer service and to even change settings of an account within the wireless communication network. Additionally, use of the voice prints can allow for access of authorized users to directory assistance and other informational services provided by the operator of the wireless communication network. The voice prints can also be utilized to positively disallow certain users from using the mobile device and/or services on the wireless communication network.

FIG. 1 illustrates a wireless communication network 100 (also referred to herein as network 100). The network 100 comprises a base station (BS) 102 communicatively coupled to a plurality of user devices, referred to as UEs 104_1, 104_2, . . . , 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, the network 100 comprises a plurality of macro cells 106, with each macro cell 106 including one or more BSs 102.

In an embodiment, the UEs 104_1, . . . , 104_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, devices configured as IoT devices, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded GPS receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 102 may communicate voice traffic and/or data traffic with one or more of the UEs 104_1, . . . , 104_N. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipment, e.g., an operation support subsystem (OSS) server 108, a radio network controller (RNC) 110, and/or the like. The RNC 110 generally serves as a gateway for the wireless communication network 100 and can also be in the form of a mobility management entity when the wireless communication network 100 operates according to the long term evolution (LTE) standard or LTE Advanced standard.

In an embodiment, the base station 102 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 102 can also be in the form of a Node B (where the wireless communication network 100 is 3G UMTS network) or in the form of an eNode B (where the wireless communication network 100 operates according to the LTE standard or LTE Advanced standard).

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processors 120. For instance, the computer-readable media 126 may store an access point control module 128 and a network settings module 130, as will be discussed in more detail herein later.

Although FIG. 1 illustrates the computer-readable media 126 in the BS 102 storing the access point control module 128 and the network settings module 130, in various other embodiments, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 10, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In an embodiment, the UEs 104 may comprise processors 140, one or more transmit antennas (transmitters) 142, one or more receive antennas (receivers) 144, and computer-readable media 146. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In an embodiment, the antennas 142 and 144 may be included in a transceiver module of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14.

The computer-readable media 146 may store several modules, such as instructions, data stores, and so forth that are configured to execute on the processors 140. For instance, the computer-readable media 140 may store a configuration module 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.).

Although not illustrated in FIG. 1, the UEs 104 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processors, one or more transmit antennas, one or more receive antennas, and computer-readable media including a configuration module.

In an embodiment, the network settings module 130 stored in the computer-readable media 126 maintains a plurality of network settings associated with the network 10. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a transmit time interval (tti) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In an embodiment, one or more of the plurality of network settings maintained by the network settings module 130 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 102 accordingly.

Figure 2:
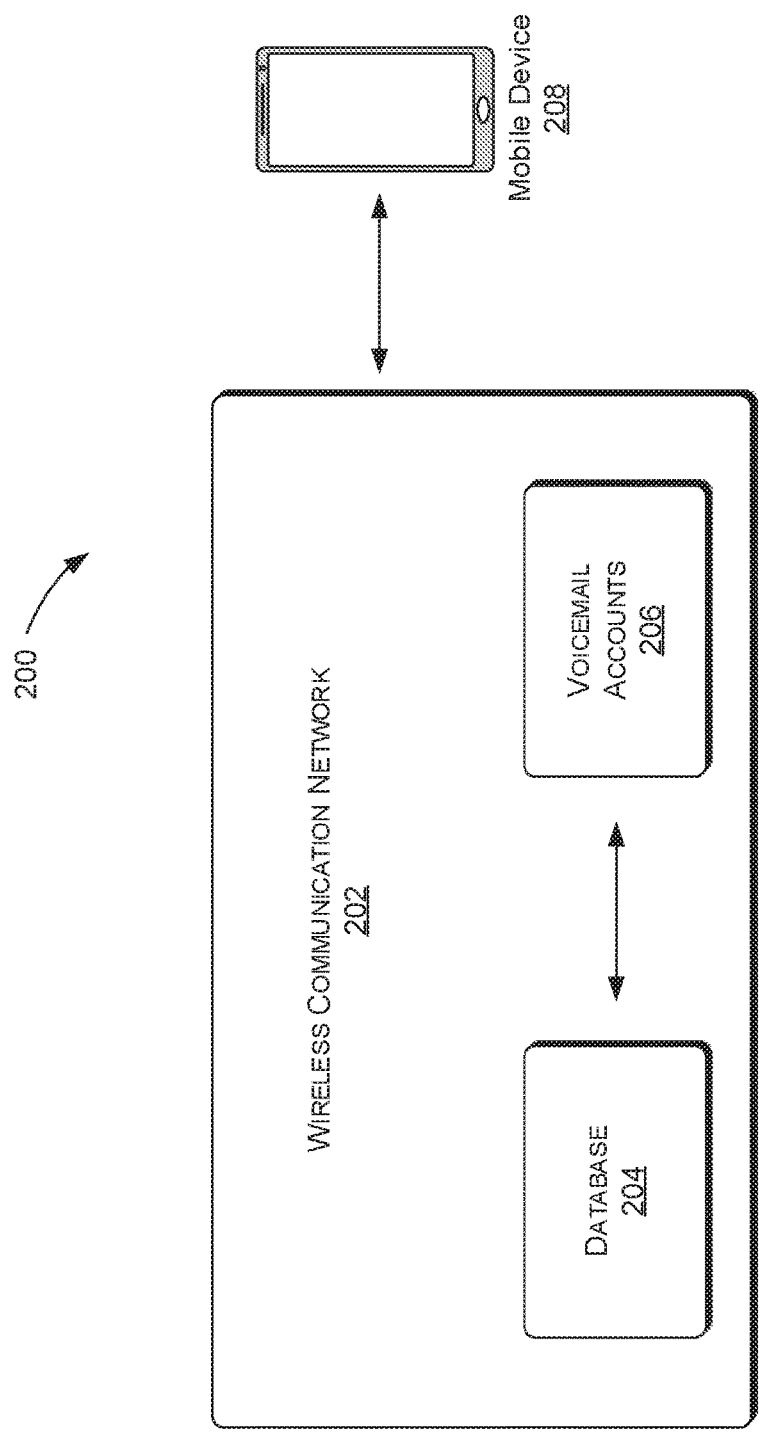
FIG. 2 schematically illustrates an arrangement for accessing the wireless communication network of FIG. 1 using secure voice print authentication, in accordance with various embodiments.

FIG. 2 schematically illustrates an arrangement 200 for accessing a wireless communication network 202, such as, for example, wireless communication network 100, using secure voice print authentication. A database 204 includes voice prints for primary users of the wireless communication network 202. The voice prints are associated with primary users of phone numbers within the wireless communication network 202. For example, a family of four may have an account with the wireless communication network 202 that includes four phone numbers within the wireless communication network 202. Each person in the family of four may be associated with one of the four numbers as a primary user. Additionally, one or more of the family of four may be associated with one or more of the other phone numbers as a secondary or additional authorized user. The voice prints for the database 204 may be obtained from voicemail accounts 206 associated with each phone number. Thus, in the present example, the database 204 includes four primary users and four primary voice prints, one associated with each phone number. The voice prints for the additional authorized users for each phone number may either be stored within the database 204 (and obtained from the voicemail accounts 206 associated with the additional authorized users' phone numbers) or may be cross-referenced by the database 204 to the additional authorized user's voicemail account 206. Thus, the voice prints of primary users and additional authorized users may be stored within the database 204, or the database 204 may store the identities of the primary users associated with phone numbers and the identities of additional authorized users associated with phone numbers, or a combination of the two. In embodiments, the voice prints based upon the stored primary users associated with phone numbers and the stored additional authorized users associated with phone numbers can be obtained from the voicemail accounts 206 when desired. Additional authorized users that do not have voicemail accounts with the wireless communication network 202 may provide voice prints to the database 204.

When a user attempts to access the wireless communication network 202 using a mobile device 208 via a phone number associated with the mobile device 208, the operator of the wireless communication network 202 compares the voice print of the user with the primary user voice print associated with the phone number stored in database 204 (or retrieved from voicemail accounts 206) and any additional authorized user voice prints stored in database 204 (or retrieved from voicemail accounts 206) associated with the phone number. Such procedures can take place in the gateway of the wireless communication network 202, e.g. the RNC 110 of the wireless network 100. Thus, the database 204 and voicemail accounts 206 may be stored in the gateway of the wireless communication network 202, e.g. the RNC 110 of the wireless network 100. If the user voice print matches one of the primary user voice print and any additional authorized user voice prints associated with the phone number, then access to the wireless communication network 202 via the phone number may be granted. For example, the user may be allowed to place a phone call, access customer service of the wireless communication network 202, access directory assistance or other informational services, etc. The voice print of the user making the request may be obtained before or after the attempt to access the wireless communication network is made.

In embodiments, access to customer service of the wireless communication network 202 may allow the primary user, or an additional authorized user, to make account changes for the primary user's phone number. Thus, the authenticated voice print helps provided additional security to help prevent unauthorized account changes. In embodiments, the identification of the primary user and/or additional authorized user via voice prints can also be utilized to allow changes to settings of the mobile device 208.

In embodiments, if the voice print of the user attempting to access the wireless communication network 202 does not match any of the primary voice print associated with the phone number and any additional authorized user voice prints associated with the phone number, the user may still be allowed to access the wireless communication network 202. In such embodiments, a notification may be provided to the primary user and/or an additional authorized user that someone is using the phone number of the primary user to access the wireless communication network 202. Such notification may be provided by a short message service (SMS) message, a multi-media messaging service (MMS) message, an e-mail message, etc. The voice prints can also be utilized to positively disallow certain users from using the mobile device 208 and/or services within the wireless communication network 208.

In embodiments, the recipient of a phone call can be provided with a positive indication that the caller is actually the primary user associated with the phone number of the incoming call or an authorized user associated with the phone number of the incoming call. In embodiments, a business associated with the primary user or authorized user may also be provided to the recipient of the phone call thereby positively identifying that the primary user or authorized user is associated with a particular business. The identity of the business associated with the primary user or the authorized user may be stored in database 202 or in a separate database.

In embodiments, voice prints may be utilized to control use of the mobile device 208s for a certain amount of time during the day and/or for limiting use to certain time periods of the day. For example, a parent may limit use of the mobile device 208 for which the child is the primary user (or any other mobile device for which the child is an authorized user) to time periods before and after school and thus, if the child attempts to use the mobile device 208 during school hours, then upon matching the voice print of the child with the voice print on record with the operator of the wireless communication network 202, the mobile device 208 will be denied access to the wireless communication network 202. Likewise, if the child has exceeded a predetermined amount of time for the day for using the mobile device 208 for which the child is the primary user, if the child attempts to use the mobile device 208 (or any other mobile device for which the child is an authorized user), then upon matching the voice print of the child with the voice print on record with the operator of the wireless communication network, the mobile device the child is attempting to use will be denied access to the wireless communication network 202.

Figure 3:
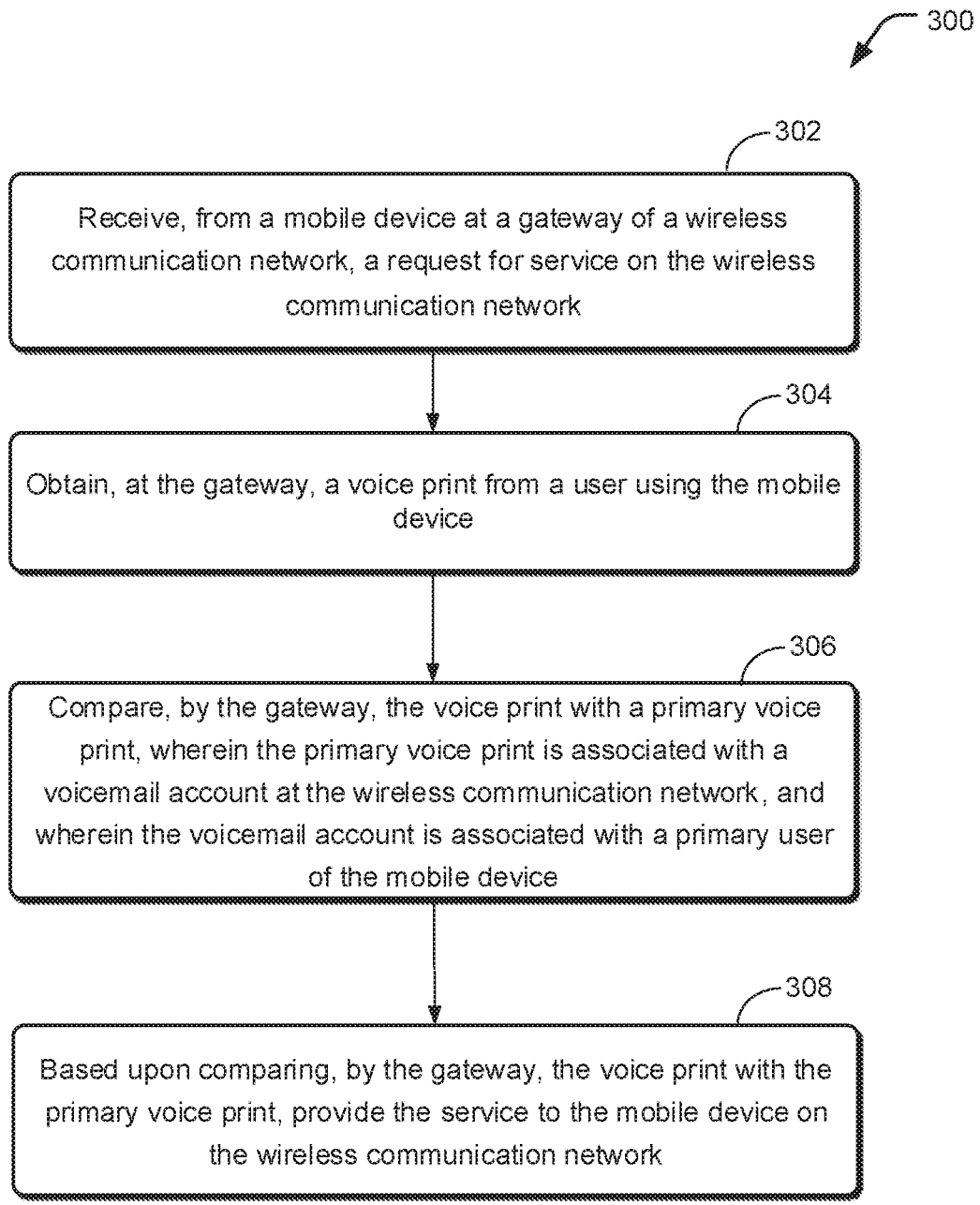
FIG. 3 is a flowchart illustrating an example method of accessing the wireless communication network of FIG. 1 using secure voice print authentication, in accordance with various embodiments.

FIG. 3 is a flowchart illustrating a method 300 of accessing a wireless communication network, e.g., wireless communication network 100 of FIG. 1, using secure voice print authentication. As illustrated, at block 302, a request is received from a mobile device at a gateway of the wireless communication network for service on the wireless communication network. At block 304, a voice print is obtained at the gateway from a user using the mobile device. At block 306, the voice print is compared by the gateway with a primary voice print, wherein the primary voice print is associated with a voicemail account at the wireless communication network, and wherein the voicemail account is associated with a primary user of the mobile device. At block 308, based upon comparing, by the gateway, the voice print with the primary voice print, the service is provided to the mobile device on the wireless communication network.

Figure 4:
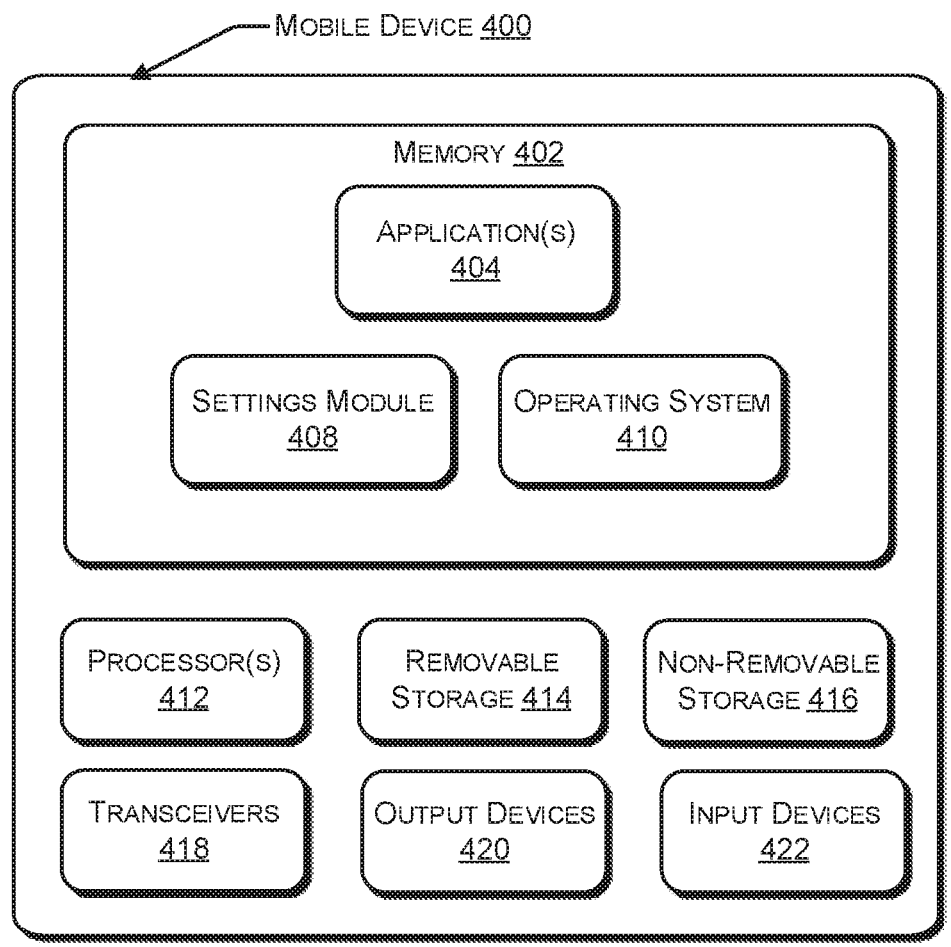
FIG. 4 illustrates a component level view of an example mobile device configured for use in the wireless communication network of FIG. 1 and the arrangement of FIG. 2.

FIG. 4 illustrates a component level view of a mobile device 400, such as UE 104, configured to function within wireless communication network 100 and arrangement 200. As illustrated, the mobile device 400 comprises a system memory 402 storing application(s) 404, a settings module 408, and an operating system 410. Also, the mobile device 400 includes processor(s) 412, a removable storage 414, a non-removable storage 416, transceivers 418, output device(s) 420, and input device(s) 422. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The mobile device 400 may also include additional data storage devices (removable and/or non-removable) such as, for example, magnetic disks, optical disks, or tape. Such additional data storage may include removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. System memory 402, removable storage 414 and non-removable storage 416 are all examples of non-transitory computer-readable media.

Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 400. Any such non-transitory computer-readable media may be part of the user device 400.

In some implementations, the transceivers 418 include any sort of transceivers known in the art. For example, the transceivers 418 may include a radio transceiver that performs the function of transmitting and receiving radio frequency communications via an antenna. Also or instead, the transceivers 418 may include wireless modem(s) to may facilitate wireless connectivity with other computing devices. Further, the transceivers 418 may include wired communication components, such as an Ethernet port, for communicating with other networked devices.

In some implementations, the output devices 420 include any sort of output devices known in the art, such as a display (e.g., a liquid crystal display), speakers, a vibrating mechanism, or a tactile feedback mechanism. Output devices 420 also include ports for one or more peripheral devices, such as headphones, peripheral speakers, or a peripheral display.

In various implementations, input devices 422 include any sort of input devices known in the art. For example, input devices 422 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 5:
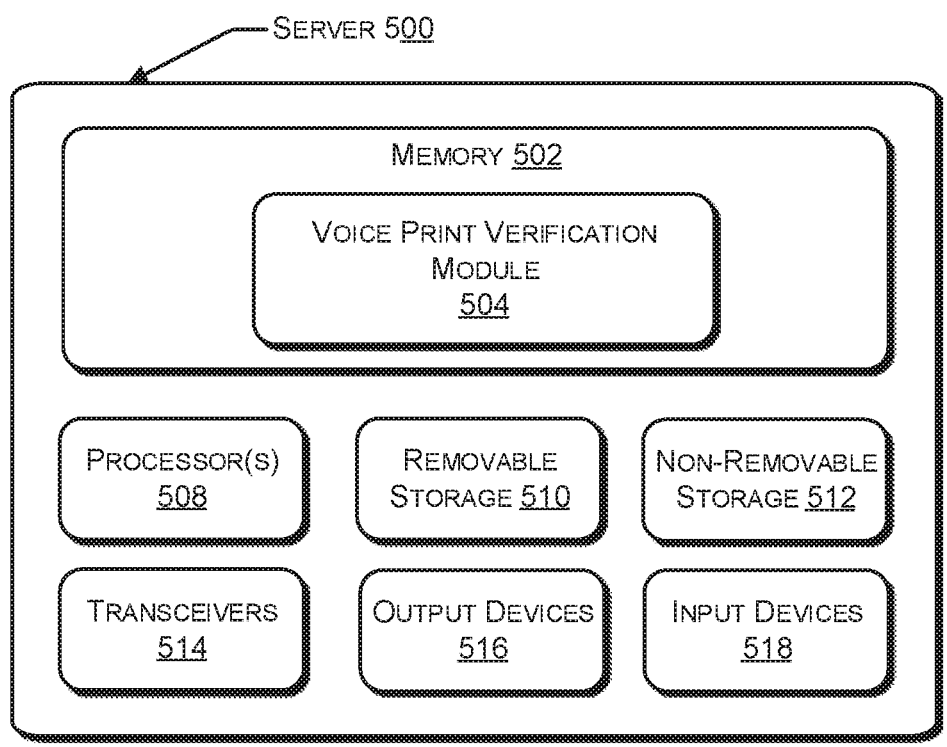
FIG. 5 illustrates a component level view of a server configured for use in the arrangement of FIG. 2 to provide access to the wireless communication network of FIG. 1 using secure voice print authentication.

FIG. 5 illustrates a component level view of a server configured to verify voice prints of users of mobile devices, e.g., UEs 104, within a wireless communication network, e.g., wireless communication network 100 in order to grant access to the wireless communication network, according to the techniques described herein. The server 500 may be located in the RNC or gateway 110. Additionally, the server 500 may be a separate entity located separately from the RNC 110. As illustrated, the server 500 comprises a system memory 502. The system memory 502 includes a Voice Print Verification Module 504. Also, the server 500 includes processor(s) 508, a removable storage 510, a non-removable storage 512, transceivers 514, output device(s) 516, and input device(s) 518.

In various implementations, system memory 502 is volatile (such as RAM), non-volatile (such as ROM, flash memory, etc.) or some combination of the two. The Voice Print Verification Module 504 is configured to verify the voice prints of users of mobile devices in conjunction with one or more processors 508 in accordance with the various techniques described herein.

In some implementations, the processor(s) 508 is a central processing unit (CPU), a graphics processing unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 510 and non-removable storage 512.

Non-transitory computer-readable media may include volatile and nonvolatile, removable and non-removable tangible, physical media implemented in technology for storage of information, such as computer readable instructions, data structures, program modules, or other data. System memory 502, removable storage 510 and non-removable storage 512 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 514 include any sort of transceivers known in the art. For example, the transceivers 514 may include wired communication components, such as an Ethernet port, for communicating with other networked devices. Also or instead, the transceivers 514 may include wireless modem(s) to may facilitate wireless connectivity with other computing devices. Further, the transceivers 514 may include a radio transceiver that performs the function of transmitting and receiving radio frequency communications via an antenna.

In some implementations, the output devices 516 include any sort of output devices known in the art, such as a display (e.g., a liquid crystal display), speakers, a vibrating mechanism, or a tactile feedback mechanism. Output devices 516 also include ports for one or more peripheral devices, such as headphones, peripheral speakers, or a peripheral display.

In various implementations, input devices 518 include any sort of input devices known in the art. For example, input devices 518 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method of providing services on a wireless communication network, the method comprising:

receiving, from a mobile device at a gateway of the wireless communication network, a request for service on the wireless communication network;

obtaining, at the gateway, a voice print from a user using the mobile device;

comparing, by the gateway, the voice print with a primary voice print, wherein the primary voice print is obtained from a voicemail account at the wireless communication network, and wherein the voicemail account is associated with a primary user of the mobile device;

based upon comparing, by the gateway, the voice print with the primary voice print, providing the service to the mobile device on the wireless communication network; and providing a notification, based at least in part on comparing the voice print with the primary voice print, to a device associated with the primary user.

2. The method of claim 1, further comprising:
comparing, by the gateway, the voice print with at least one secondary voice print, wherein the at least one secondary voice print is associated with an authorized user of the mobile device,
wherein providing the service to the mobile device on the wireless communication network is further based upon comparing, by the gateway, the voice print with the at least one secondary voice print.

3. The method of claim 2, further comprising providing a second notification to a second device associated with the authorized user, based in part on comparing the voice print with the at least one secondary voice print.

4. The method of claim 1, wherein providing the notification to the device comprises providing the notification via at least one of a short message service (SMS) message, a multimedia messaging service (MMS) message or an e-mail message.

5. The method of claim 2, wherein the voice print matches the primary voice print and the method further comprises limiting the providing of the service to the mobile device to one or more predetermined time periods.

6. The method of claim 2, wherein the voice print matches the primary voice print and the method further comprises limiting the providing of the service to the mobile device to a predetermined amount of time.

7. The method of claim 1, wherein providing the service to the mobile device on the wireless communication network comprises providing access to the mobile device on the wireless communication network.

8. The method of claim 7, wherein providing the service to the mobile device on the wireless communication network further comprises providing access, to the mobile device, to customer service of the wireless communication network.

9. The method of claim 8, further comprising based upon comparing, by the gateway, the voice print with the primary voice print, changing account settings of an account of the primary user at the wireless communication network.

10. The method of claim 7, wherein providing the service to the mobile device on the wireless communication network further comprises providing access, to the mobile device, to directory assistance.

11. The method of claim 7, further comprising based upon the comparing, providing a second notification to a recipient of a telephone call from the mobile device of an identity of a user of the mobile device.

12. The method of claim 11, wherein the second notification further comprises a business name associated with the user of the mobile device.

13. A gateway of a wireless communication network comprising:
a processor; and
instructions that, when executed by the processor, cause the gateway to perform operations including:
receiving, from a mobile device, a request for service on the wireless communication network;
obtaining a voice print from a user using the mobile device;
comparing the voice print with a primary voice print, wherein the primary voice print is obtained from a voicemail account at the wireless communication network, and wherein the voicemail account is associated with a primary user of the mobile device;
based upon comparing the voice print with the primary voice print, providing the service to the mobile device on the wireless communication network; and
providing a notification, based in part on comparing the voice print with the primary voice print, to a device associated with the primary user.

14. The gateway of claim 13, wherein the operations further comprise:
comparing the voice print with at least one secondary voice print, wherein the at least one secondary voice print is associated with an authorized user of the mobile device,
wherein providing the service to the mobile device on the wireless communication network is further based upon comparing the voice print with the at least one secondary voice print.

15. The gateway of claim 14, wherein the operations further comprise providing a second notification to a second device associated with the authorized user, based in part on comparing the voice print with the at least one secondary voice print.

16. The gateway of claim 13, wherein the notification is provided via at least one of a short message service (SMS) message, a multimedia messaging service (MMS) message or an e-mail message.

17. The gateway of claim 14, wherein the voice print matches the primary voice print and the operations further comprise limiting provision of the service to the mobile device to one or more predetermined time periods.

18. The gateway of claim 14, wherein the voice print matches the primary voice print and the operations further comprise limiting provision of the service to the mobile device to a predetermined amount of time.

19. The gateway of claim 13, wherein the service comprises access by the mobile device on the wireless communication network.

20. The gateway of claim 19, wherein the service further comprises access to customer service of the wireless communication network.

21. The gateway of claim 20, wherein the service further comprises changing account settings of an account of the primary user at the wireless communication network.

22. The gateway of claim 19, wherein the operations further comprise providing a second notification to a recipient of a telephone call from the mobile device of an identity of a user of the mobile device.

23. The gateway of claim 22, wherein the second notification further comprises a business name associated with the user of the mobile device.

* * * * *